3,140,267
ALKYD RESINS MODIFIED WITH OMEGA LACTONE
Eugene Bortnek, Newark, Joseph Albert Vona, Westfield, and Edward J. Kuzma, Woodbridge, N.J., assignors to Celanese Corporation of America, New York, N.Y., a corporation of Delaware
No Drawing. Filed May 4, 1960, Ser. No. 26,705
16 Claims. (Cl. 260—22)

This invention relates to the improvement of modified alkyd resins and particularly alkyd resins modified by the inclusion of drying oils or drying oil acids.

Drying oil modified alkyd resins are useful in the formulation of paints, enamels and lacquers. When formulations containing such resins are applied to surfaces they form protective films upon hardening by drying and/or heating.

It is an object of this invention to further modify such resins so that films prepared therefrom have improved weathering characteristics and physical characteristics.

We have found unexpectedly that the properties of these materials may be substantially improved by treating them with an omega lactone (a lactone of an omega hydroxy carboxylic acid) and preferably an omega lactone having from 3 to 6 carbon atoms. A representative and the preferred compound for this use is beta propiolactone (the lactone of beta hydroxy propionic acid). Other omega lactones which may be used are gamma butyrolactone, delta valerolactone and epsilon caprolactone.

While our invention is not limited to coatings, it is convenient, in describing the characteristics that are modified, to do so in terms normally associated with coatings. For example, properties of a film such as shrinkage during drying, hardness, water resistance and other concomitant and related properties are important in a coating.

An improvement in any of the above properties of a coating or any such material is herein referred to in the specification and claims as an improvement in the "drying or resistance" properties thereof. The term "coating" is used herein in the specification and claims to mean a film-forming coating composition as it exists either prior to or after its application to the surface to be coated.

The term "alkyd resin" is used herein to include any polymeric material which has been produced from the reaction of a polyhydric alcohol with a polycarboxylic acid or anhydride or from the polymerization of a hydroxy carboxylic acid. It includes products produced by the reaction of such polyhydric alcohols as glycerin, ethylene glycol, diethylene glycol, propylene glycol, pentaerythritol, trimethylol propane and mixtures thereof with polycarboxylic acids and anhydrides, such as phthalic anhydride, maleic anhydride, fumaric acid, terephthalic acid, succinic acid and mixtures thereof. The term "polycarboxylic acid" as used herein, includes anhydrides. Phthalic alkyd resins wherein phthalic anhydride is the sole or major polycarboxylic acid constituent are preferred.

The term "drying oil-modified alkyd resin" is used herein to include products produced by the reaction of the above specified polyhydric alcohols and polycarboxylic acids with a drying oil or drying oil acid. Among the drying oil modifiers which may be used are linseed oil, soybean oil, perilla oil, sunflower oil, oiticia oil and tung oil and the fatty acids derived from the hydrolysis of such oils. The drying oils are preferably those with Iodine Numbers of at least 100. The drying oil is suitably used in proportions ranging from 9 to 30 gallons of oil per 100 lbs. of glyceryl phthalate, for example, with amounts between 22 and 30 gallons per 100 lbs. generally designated as "long-oil alkyds," amounts between 14 and 20 gallons per 100 lbs. designated as medium-oil alkyds and amounts between 9 and 12.5 gallons per 100 lbs. designated as short-oil alkyds. The term "drying oil" as used herein includes drying oil acids.

We do not have a full explanation for the improved product obtained through utilization of our invention. However, the improved properties may be due in part to the reaction of the lactone with a portion of the excess hydroxyl groups in the material treated to produce an ether linkage and carboxyl termination and the further reaction of the carboxyl groups with another portion of the excess hydroxyl groups to produce cross-linking.

Our invention may be utilized in the production of a variety of types of coatings, including lacquers, varnishes, enamels and paints (either oil base or water base types). It may be utilized whether the coating is to be dried by solvent evaporation, air-dried or heat-hardened and may be utilized when applied to any article or base to which such coatings are normally applied.

For example, in the case of varnishes, where such drying oil-modified alkyds, are frequently used, such alkyds may be treated with omega lactones to give the varnish improved drying and chemical resistance properties. Resins may be used to further modify the alkyds in such compositions. Such resins may be either natural or synthetic. A phenol formaldehyde resin is typical of the latter, and rosin or copal is typical of the former.

The coating may also include pigments or dyes, driers, diluents, solvents, stabilizers, and other materials conventionally used by those skilled in the art.

The modification of the alkyd material with the lactones of our invention may be made at any appropriate point after resin formation has proceeded to a substantial extent and preferably after it is substantially complete. Preferably, the lactone should not be introducing until the acid number of the reaction mixture is below about 10. The lactone may be blended with the alkyd resin just prior to the application thereof to a surface and reacted during the curing operation.

The nature of the material to be treated in accordance with our improved method will, of course, vary. Ordinarily such material will have from about 5 to 35% excess hydroxyl groups. Generally, the amount of lactone used will depend on the amount of residual hydroxyl present in the material. Between about 1 and 2 equivalents of lactone per hydroxy equivalent in the alkyd is suitable for most alkyds.

Generally, it will be found desirable to heat the material with the lactone in the temperature range of 160° C. to 260° C. for from one to five hours.

If the lactone is to be heated with the material to be treated to react without curing, it will generally be preferable to carry out the heating under an inert atmosphere such as nitrogen in order to avoid oxidation of the drying oil.

Where beta-propiolactone is used to modify a drying oil modified alkyd resin containing about 10% excess hydroxyl, as in Example 1, we have found it preferable to use approximately 1% to 7% of the lactone based on the alkyd resin and to heat the resin and lactone in the temperature range of from about 160° C. to about 250° C.

The following examples will further illustrate our invention. All reactions were carried out under a nitrogen atmosphere.

*Example I*

Two samples of a long oil alkyd resin each were prepared by reacting a composition having the following formula and giving about 10% excess hydroxyl:

| | Percent by weight |
|---|---|
| Tall oil fatty acids | 54.2 |
| Pentaerythritol | 20.8 |
| Phthalic anhydride | 25.0 |

The first sample was reacted at approximately 245° C. for about three and one-half hours.

The second sample was reacted for about one and one-half hours. 3.4% of beta propiolactone (by weight based on the alkyd resin) was then added to the resin and it was reacted further at approximately 245° C. for an additional time of about 2 hours.

After reaction, driers (0.5% lead naphthenate and 0.05% cobalt naphthenate by weight based on the alkyd resin) were added to each of the samples. A clear film of each sample was drawn on glass and air-dried. The set to touch time for the second sample (modified with beta propiolactone) was 20 minutes as contrasted with 38 minutes for the unmodified first sample. After exposure of each of the films to 70° C. water for 20 minutes the film from the second sample was substantially harder than the film from the unmodified first sample showing that the reaction with beat propiolactone gave enhanced properties.

*Example II*

Two samples of an alkyd resin each were prepared by reacting a composition having the same formulation set forth above in tabular form in Example I. The first sample was reacted at approximately 245° C. for about three and one-half hours. The second sample was reacted slightly in excess of 2 hours at about 245° C. Then 1.66% of beta propiolactone was added to the resin and the mixture, together with sufficient Varsol #1 (a naphthenic solvent having a boiling range of 320°–390° F. and a Kauri Butanol value of 39.1) to maintain a fluid system, was further heated at about 175° C. for an additional 5 hours approximately. The hydroxyl value of the first sample after reaction was about 44 and the hydroxyl value of the second sample after modification with the lactone was about 21.

Driers were added as in Example I and clear films of each sample were drawn on glass and dried in air at 23° C. over a weekend. Each film was exposed to 70° C. water for 20 minutes. The film of the second lactone-modified sample was substantially harder than the film from the unmodified first sample showing that reaction with the beta propiolactone gave improved drying and resistance properties to the former.

*Example III*

Two samples of alkyd resin were formulated as in Examples I and II. The first was reacted for about 3¾ hours at approximately 245° C. The second sample was heated for about 3½ hours at 245° C. approximately; thereafter 2% of beta propiolactone was added and the mixture was further heated for about another hour at temperatures decreasing from about 245° C. to about 175° C. The hydroxyl value of the latter sample at such time was about 17 as contrasted with a value of 44 for the former.

*Example IV*

Two samples of a short oil alkyd resin each were prepared by reacting composition having the following formula and an excess hydroxyl content of 32.5%.

| | Percent by weight |
|---|---|
| Tall oil fatty acids | 18.6 |
| Trimethylolpropane | 38.4 |
| Phthalic anhydride | 43.0 |

The first sample was heated for about 4½ hours at approximately 210° C. The second sample was heated for about 3½ hours at 210° C. and 6.7% beta propiolactone was added and the mixture was heated at that temperature for another half hour approximately. After reaction the hydroxyl value of the first sample was about 112 and of the second about 18.

It is to be understood that the foregoing detailed description is given merely by way of illustration and that many variations may be made therein without departing from the spirit of our invention.

Having described our invention what we desire to secure by Letters Patent is:

1. The method for improving a drying oil-modified alkyd resin having residual hydroxyl groups, which comprises mixing such resin with an amega lactone and heating the resulting mixture in an inert atmosphere.

2. The method of claim 1 wherein such lactone is beta propiolactone.

3. The method of claim 1 wherein such lactone is mixed with said resin in an amount between one and two moles of lactone per hydroxy equivalent of said alkyd resin.

4. The method of claim 1 wherein such drying oil-modified alkyd resin is a glyceryl phthalate resin having from 9 to 30 gallons of drying oil per 100 lbs. of glyceryl phthalate.

5. The method of claim 1 wherein such resin and lactone are heated after mixing to a temperature between 160° and 260° C. for a period between one and five hours.

6. The method of claim 1 wherein such drying oil-modified resin is a pentaerythritol phthalate having from 9 to 30 gallons of drying oil per 100 lbs. of pentaerythritol phthalate.

7. The method of preparing an improxed drying oil-modified alkyd resin which comprises reacting a polyhydroxy alcohol, a polycarboxylic acid and a drying oil in a system wherein said polyhydroxy alcohol is present in stoichiometric excess until the acid number of the mixture is reduced to not more than about 10, adding an omega lactone to said reaction product and reacting said omega lactone with said reaction product.

8. The method of claim 7 wherein such lactone is beta propiolactone.

9. The method of claim 8 wherein such polycarboxylic acid is phthalic anhydride.

10. The method of claim 7 wherein such resin and lactone are heated after mixing to a temperature between 160° and 260° C. for a period between one and five hours.

11. The reaction product of a drying oil-modified alkyd resin and an omega lactone.

12. The reaction product of a drying oil-modified alkyd resin and beta propiolactone.

13. A coated article having a coating comprising a cured reaction product of a drying oil-modified alkyd resin and beta propiolactone.

14. An admixture of a drying oil-modified alkyd resin and an omega lactone.

15. An admixture of a drying oil-modified alkyd resin and beta propiolactone.

16. The method of preparing an improved drying oil modified alkyd resin which comprises reacting together a drying oil selected from the group consisting of linseed oil, soybean oil, perilla oil, sunflower oil, oiticica oil, tall oil and tung oil, a polycarboxylic acid selected from the group consisting of phthalic anhydride, maleic anhydride, fumaric acid, terephthalic acid and succinic acid and a stoichiometric excess, based upon hydroxyl as compared to carboxyl groups, of about 5 to 35% hydroxyl of a polyol selected from the group consisting of glycerin, ethylene glycol, diethylene glycol, propylene glycol, pentaerythritol and trimethylolpropane to form a drying oil modified alkyd resin having an acid number up to about 10; heating said resin, under an inert atmosphere, with about 1 to 2 equivalents per hydroxy equivalent in said resin of an omega-lactone selected from the group consisting of beta-propiolactone, gamma-butyrolactone, delta-valerolactone and epsilon-caprolactone at about 160 to 260° C. for about 1 to 5 hours.

References Cited in the file of this patent

UNITED STATES PATENTS 2,964,482    Leary et al. _____ Dec. 13, 1960

FOREIGN PATENTS 1,173,650    France _____ Feb. 27, 1959
1,174,204    France _____ Mar. 9, 1959
1,174,207    France _____ Mar. 9, 1959